(12) United States Patent
Broden et al.

(10) Patent No.: US 8,332,280 B2
(45) Date of Patent: *Dec. 11, 2012

(54) SYSTEM FOR MANAGING A SUPPLIER FOR PARTICIPATION IN A PLURALITY OF TRADING NETWORKS

(75) Inventors: Theresa W. Broden, Johnson City, NY (US); Glenn C. Godoy, Endicott, NY (US); Jane M. Murphy, Vestal, NY (US); Mark A. Musa, Brackney, PA (US); Sherry L. Wilson, Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,682

(22) Filed: Jul. 18, 2011

(65) Prior Publication Data

US 2011/0276458 A1 Nov. 10, 2011

Related U.S. Application Data

(62) Division of application No. 11/807,324, filed on May 25, 2007, now Pat. No. 7,983,958, which is a division of application No. 09/798,598, filed on Mar. 2, 2001, now Pat. No. 7,243,077.

(51) Int. Cl.
*G06Q 30/00* (2006.01)
(52) U.S. Cl. ....... 705/26.2; 705/26.1; 705/35; 705/36 R; 705/80
(58) Field of Classification Search ......... 705/26.1–27.2
See application file for complete search history.

(56) References Cited

U.S. PATENT DOCUMENTS

| 4,799,156 A | 1/1989 | Shavit et al. |
| 4,947,028 A | 8/1990 | Gorog |
| 5,021,953 A | 6/1991 | Webber et al. |

(Continued)

FOREIGN PATENT DOCUMENTS

GB 2082814 A 3/1982

(Continued)

OTHER PUBLICATIONS

[Annotated] www.demandline.com. Feb. 26, 2000. [recovered from www.Archive.org].*

(Continued)

*Primary Examiner* — William Allen
(74) *Attorney, Agent, or Firm* — Schmeiser, Olsen & Watts; William E. Schiesser

(57) ABSTRACT

A system for performing a method for managing a supplier for participation in trading networks. The method includes: receiving from each trading network a volume commitment consolidating volume commitments for offerings of commodities and services; negotiating with each trading network to supply to customer members of the trading network the commodity or service; storing, for each trading network for each supplier, attributes including start date, end date, services and products offered to the trading network, and payment flow for the commodities and services; offing a trading network package based on negotiations occurring before receiving purchase requests from the customer members, the trading network package including: (i) a value-add service offering to the customer members for a fee, and (ii) a managed package for which a customer member provides a volume commitment and actual purchases are tracked; and negotiating price discount levels for committed levels of demand from the trading networks.

8 Claims, 7 Drawing Sheets

U.S. PATENT DOCUMENTS

| | | |
|---|---|---|
| 5,117,356 A | 5/1992 | Marks |
| 5,168,444 A | 12/1992 | Cukor et al. |
| 5,189,608 A | 2/1993 | Lyons et al. |
| 5,319,542 A | 6/1994 | King et al. |
| 5,335,169 A | 8/1994 | Chong |
| 5,361,393 A | 11/1994 | Rossillo |
| 5,390,113 A | 2/1995 | Sampson |
| 5,544,298 A | 8/1996 | Kanavy et al. |
| 5,640,550 A | 6/1997 | Coker |
| 5,666,493 A | 9/1997 | Wojcik et al. |
| 5,694,551 A | 12/1997 | Doyle et al. |
| 5,712,989 A | 1/1998 | Johnson et al. |
| 5,715,453 A | 2/1998 | Stewart |
| 5,721,832 A | 2/1998 | Westrope et al. |
| 5,737,592 A | 4/1998 | Nguyen et al. |
| 5,758,327 A | 5/1998 | Gardner et al. |
| 5,758,351 A | 5/1998 | Gibson et al. |
| 5,781,908 A | 7/1998 | Williams et al. |
| 5,794,207 A | 8/1998 | Walker et al. |
| 5,799,151 A | 8/1998 | Hoffer |
| 5,802,518 A | 9/1998 | Karaev et al. |
| 5,815,829 A | 9/1998 | Zargar |
| 5,838,906 A | 11/1998 | Doyle et al. |
| 5,838,916 A | 11/1998 | Domenikos et al. |
| 5,870,717 A | 2/1999 | Wiecha |
| 5,918,017 A | 6/1999 | Attanasio et al. |
| 5,963,922 A | 10/1999 | Helmering |
| 5,963,925 A | 10/1999 | Kolling et al. |
| 5,970,475 A | 10/1999 | Barnes et al. |
| 5,974,407 A | 10/1999 | Sacks |
| 6,003,039 A | 12/1999 | Barry et al. |
| 6,006,204 A | 12/1999 | Malcolm |
| 6,014,134 A | 1/2000 | Bell et al. |
| 6,016,394 A | 1/2000 | Walker |
| 6,023,683 A | 2/2000 | Johnson et al. |
| 6,023,729 A | 2/2000 | Samuel et al. |
| 6,029,150 A | 2/2000 | Kravitz |
| 6,032,130 A | 2/2000 | Alloul et al. |
| 6,032,145 A | 2/2000 | Beall et al. |
| 6,032,150 A | 2/2000 | Nguyen |
| 6,047,268 A | 4/2000 | Bartoli et al. |
| 6,052,785 A | 4/2000 | Lin et al. |
| 6,055,516 A | 4/2000 | Johnson et al. |
| 6,055,519 A | 4/2000 | Kennedy et al. |
| 6,058,373 A | 5/2000 | Blinn et al. |
| 6,058,380 A | 5/2000 | Anderson et al. |
| 6,058,381 A | 5/2000 | Nelson |
| 6,064,977 A | 5/2000 | Haverstock et al. |
| 6,094,654 A | 7/2000 | Van Huben et al. |
| 6,104,717 A | 8/2000 | Coile et al. |
| 6,112,242 A | 8/2000 | Jois et al. |
| 6,115,690 A | 9/2000 | Wong |
| 6,125,363 A | 9/2000 | Buzzeo et al. |
| 6,128,602 A | 10/2000 | Northington et al. |
| 6,144,991 A | 11/2000 | England |
| 6,151,608 A | 11/2000 | Abrams |
| 6,163,805 A | 12/2000 | Silva et al. |
| 6,185,545 B1 | 2/2001 | Resnick et al. |
| 6,199,113 B1 | 3/2001 | Alegre et al. |
| 6,208,345 B1 | 3/2001 | Sheard et al. |
| 6,219,680 B1 | 4/2001 | Bernardo et al. |
| 6,239,797 B1 | 5/2001 | Hills et al. |
| 6,240,399 B1 | 5/2001 | Frank et al. |
| 6,260,024 B1 | 7/2001 | Shkedy |
| 6,269,343 B1 | 7/2001 | Pallakoff |
| 6,314,408 B1 | 11/2001 | Salas et al. |
| 6,317,751 B1 | 11/2001 | Yeger et al. |
| 6,330,575 B1 | 12/2001 | Moore et al. |
| 6,336,114 B1 | 1/2002 | Garrison |
| 6,343,284 B1 | 1/2002 | Ishikawa et al. |
| 6,343,287 B1 | 1/2002 | Kumar et al. |
| 6,356,283 B1 | 3/2002 | Guedalia |
| 6,360,211 B1 | 3/2002 | Anderson et al. |
| 6,381,644 B2 | 4/2002 | Munguia et al. |
| 6,401,120 B1 | 6/2002 | Gamache et al. |
| 6,418,415 B1 | 7/2002 | Walker et al. |
| 6,418,420 B1 | 7/2002 | DiGiorgio et al. |
| 6,418,467 B1 | 7/2002 | Schweitzer et al. |
| 6,430,538 B1 | 8/2002 | Bacon et al. |
| 6,449,744 B1 | 9/2002 | Hansen |
| 6,452,609 B1 | 9/2002 | Katinsky et al. |
| 6,453,353 B1 | 9/2002 | Win et al. |
| 6,460,041 B2 | 10/2002 | Lloyd |
| 6,466,949 B2 | 10/2002 | Yang et al. |
| 6,466,980 B1 | 10/2002 | Lumelsky et al. |
| 6,477,510 B1 | 11/2002 | Johnson |
| 6,486,891 B1 | 11/2002 | Rice |
| 6,499,036 B1 | 12/2002 | Gurevich |
| 6,507,826 B1 | 1/2003 | Maners |
| 6,516,327 B1 | 2/2003 | Zondervan et al. |
| 6,523,027 B1 | 2/2003 | Underwood |
| 6,535,294 B1 | 3/2003 | Arledge, Jr. et al. |
| 6,539,396 B1 | 3/2003 | Bowman-Amuah |
| 6,578,068 B1 | 6/2003 | Bowman-Amuah |
| 6,589,290 B1 | 7/2003 | Maxwell et al. |
| 6,594,819 B1 | 7/2003 | Ciarlante et al. |
| 6,601,084 B1 | 7/2003 | Bhaskaran et al. |
| 6,606,643 B1 | 8/2003 | Emens et al. |
| 6,611,822 B1 | 8/2003 | Beams et al. |
| 6,631,382 B1 | 10/2003 | Kouchi et al. |
| 6,631,402 B1 | 10/2003 | Devine et al. |
| 6,643,690 B2 | 11/2003 | Duursma et al. |
| 6,668,253 B1 | 12/2003 | Thompson et al. |
| 6,681,229 B1 | 1/2004 | Cason et al. |
| 6,684,384 B1 | 1/2004 | Bickerton et al. |
| 6,686,932 B2 | 2/2004 | Rath et al. |
| 6,687,731 B1 | 2/2004 | Kavak |
| 6,704,612 B1 | 3/2004 | Hahn-Carlson |
| 6,725,264 B1 | 4/2004 | Christy |
| 6,760,775 B1 | 7/2004 | Anerousis et al. |
| 6,772,167 B1 | 8/2004 | Snavely et al. |
| 6,785,822 B1 | 8/2004 | Sadhwani-Tully |
| 6,801,949 B1 | 10/2004 | Bruck et al. |
| 6,826,542 B1 | 11/2004 | Virgin et al. |
| 6,834,294 B1 | 12/2004 | Katz |
| 6,839,680 B1 | 1/2005 | Liu et al. |
| 6,847,953 B2 | 1/2005 | Kuo |
| 6,853,630 B1 | 2/2005 | Manning |
| 6,882,983 B2 | 4/2005 | Furphy et al. |
| 6,886,134 B1 | 4/2005 | Cason |
| 6,922,671 B2 | 7/2005 | Musa et al. |
| 6,928,411 B1 | 8/2005 | Fox et al. |
| 6,934,690 B1 | 8/2005 | Van Horn et al. |
| 6,947,063 B1 | 9/2005 | Cirulli et al. |
| 6,950,983 B1 | 9/2005 | Snavely |
| 6,965,938 B1 | 11/2005 | Beasley et al. |
| 6,971,107 B2 | 11/2005 | Sjostrom et al. |
| 7,003,474 B2 | 2/2006 | Lidow |
| 7,133,868 B1 | 11/2006 | Ruest et al. |
| 7,155,403 B2 | 12/2006 | Cirulli et al. |
| 7,171,374 B1 | 1/2007 | Sheehan et al. |
| 7,197,480 B1 | 3/2007 | Chollon et al. |
| 7,243,077 B2 | 7/2007 | Broden et al. |
| 7,266,503 B2 | 9/2007 | Cason et al. |
| 7,283,976 B2 | 10/2007 | Aber et al. |
| 7,349,879 B2 | 3/2008 | Alsberg et al. |
| 7,356,496 B2 | 4/2008 | Kane et al. |
| 7,363,246 B1 | 4/2008 | Van Horn et al. |
| 7,386,495 B2 | 6/2008 | Cirulli et al. |
| 7,835,956 B2 | 11/2010 | Aber et al. |
| 7,848,970 B2 | 12/2010 | Kane et al. |
| 7,895,095 B2 | 2/2011 | Chollon et al. |
| 7,983,958 B2 | 7/2011 | Broden et al. |
| 8,229,814 B2 | 7/2012 | Baumann et al. |
| 2001/0011222 A1 | 8/2001 | McLauchlin et al. |
| 2001/0032162 A1 | 10/2001 | Alsberg et al. |
| 2001/0051913 A1 | 12/2001 | Vashistha et al. |
| 2002/0019740 A1 | 2/2002 | Matsuo et al. |
| 2002/0055878 A1 | 5/2002 | Burton et al. |
| 2002/0065736 A1 | 5/2002 | Willner et al. |
| 2002/0065885 A1 | 5/2002 | Buonanno et al. |
| 2002/0087441 A1 | 7/2002 | Wagner, Jr. et al. |
| 2002/0091597 A1 | 7/2002 | Teng |
| 2002/0093538 A1 | 7/2002 | Carlin |
| 2002/0103731 A1 | 8/2002 | Barnard et al. |
| 2002/0107890 A1 | 8/2002 | Gao et al. |
| 2002/0128944 A1 | 9/2002 | Crabtree et al. |

| | | | |
|---|---|---|---|
| 2002/0138281 | A1 | 9/2002 | Cirulli et al. |
| 2002/0138658 | A1 | 9/2002 | Sjostrom et al. |
| 2002/0143699 | A1 | 10/2002 | Baumann et al. |
| 2002/0161606 | A1 | 10/2002 | Bennett et al. |
| 2002/0161667 | A1 | 10/2002 | Felkey et al. |
| 2002/0184111 | A1 | 12/2002 | Swanson |
| 2002/0184125 | A1 | 12/2002 | Cirulli et al. |
| 2003/0074580 | A1 | 4/2003 | Knouse et al. |
| 2003/0093320 | A1 | 5/2003 | Sullivan |
| 2003/0139996 | A1 | 7/2003 | D'Antoni et al. |
| 2003/0187688 | A1 | 10/2003 | Fey et al. |
| 2003/0220875 | A1 | 11/2003 | Lam et al. |
| 2004/0015367 | A1 | 1/2004 | Nicastro et al. |
| 2004/0078275 | A1 | 4/2004 | Ismert et al. |
| 2005/0097016 | A1 | 5/2005 | Barnard et al. |
| 2007/0179894 | A1 | 8/2007 | Cirulli et al. |
| 2008/0071653 | A1 | 3/2008 | Cirulli et al. |

FOREIGN PATENT DOCUMENTS

| | | |
|---|---|---|
| WO | WO 98/49639 | 11/1998 |

OTHER PUBLICATIONS

Office Action (Mail Date Sep. 21, 2011) for U.S. Appl. No. 13/198,755, filed Aug. 5, 2011.
Lotus Development Corp., an IBM Subsidiary. Lotus Domino: Application Development with Domino Designer, Rel. 5. USA, privately printed, 1998. i-vii, 425-430.
Lotus Development Corp., an IBM Subsidiary. Lotus Domino: Domino Enterprise Integration Guide, Rel. 5. USA, privately printed, 1998. 9-20, 107-122, 444-451.
Berners-Lee et al.; "Uniform Resource Locators (URL)"; Request for Comments (RFC) 1738; Dec. 1994.
Brown et al.; "Mastering Lotus Notes"; pp. 6-15, 486-483; ISBM 0782113028; 1995.
Tewari et al.; "High Availability in Clustered Multimedia Servers"; Proceedings of the Twelfth International Conference on Data Engineering; pp. 645-654; Feb. 1996.
Cardellini et al.; "Redirection algorthims for load sharing in distributed Web-server systems"; Proceedings. 19th IEEE International Conference on Distributed Computing Systems; pp. 528-535; May 1999.
John D'Esposito. Proxy Pass Implementation in GWA. Undated. 13 pages. Published before Sep. 6, 2000 on the Internet at <htt;://w3.ibm.com/media/juke/presenter/gwa/proxy/proxy.html>.
Sun Microsystems, Inc. Java 2 Enterprise Edition Technical Documentation. Copyright 1999. 1 page.
Sun Microsystems, Inc. Java 2 Enterprise Edition Developer's Guide. Copyright 1999. Table of Contents (7 pages) and Chapter 8 "Security" (10 pages).
Dynamic HTML in Action Written by William J. Pardi and Eric Schurman, 1998.
Gershenfeld, Nancy; "Client-server: What Is It and Are We There Yet?" Online. Medford: Mar. 1995. vol. 19, Iss. 2; p. 60, 6 pages.
University of New Hampshire Financial and Administrative Procedures, 1994, 11 pages.
Minnesota Statewide Administrative Systems webpage describing three way match, Jun. 29, 1995, 1 page.
US Dept. of Energy, I-Manage Stars Functional and Technical Requirements, Sep. 2000, 54 pages.
X12 Transaction Set Index Version 3040, undated, 4 pages.
All Open Orders For Customer, Nov. 23, 1999, Motorola.
Elaine Marmel and Diane Koers, Peachtree 8 for Dummies, © 2000, Hungry Minds, Inc.
David Kroenke, Database Processing, © 1983, 1977, Science Research Associates, Inc.
Deitel & Deitel, Java How to Program, © 1998, 1997, Prentice-Hall.
State of Texas Statewide Electronic Commerce Feasibility Study; May 15, 1998; Phoenix Planning & Evaluation, Ltd. Rockville, MD 20852.x.
Yehuda Shiran; Sharing functions between frames, Jul. 29, 2000.
JavaScrip and Frames, Part II—The Famous Memory Game, Apr. 5, 1999.
Tom Negrino, JavaScript for the World Wide Web: Visual QuickStar Guide (3rd Edition), 2000.
Baron et al.; "Web-based E-catalog systems inB2B procurement", Association for Computing Machinery, May 2000, vol. 43 No. 5, p. 93+.
van Riel et al.; "Exploring consumer evaluations of e-services: a portal site", International Journal of Service Industry Management, 2001, vol. 12 No. 3, p. 359+.
USBI bill dated Jul. 22, 1998. two web site pages with background on USBI (www.billview.com and www.billingconcepts.com).
Valentine, Lisa. "Banks' accounting systems showing their age." Bank Technology News Nov. 1, 1998: Banking Information Source, ProQuest. Web. Jul. 13, 2010.
www.demandline.com Dated Feb. 26, 2000 to Oct. 31, 2000. [Recovered from www.Archive.org].
Office Action (Mail Date Oct. 8, 2010) for U.S. Appl. No. 11/807,324, filed May 25, 2007, First Named Inventor Theresa W. Broden.
Notice of Allowance (Mail Date Mar. 3, 2011) for U.S. Appl. No. 11/807,324, filed May 25, 2007.
Notice of Allowance (Mail Date May 20, 2011) for U.S. Appl. No. 09/819,462, filed Mar. 28, 2001.
Office Action (Mail Date Mar. 30, 2009) for U.S. Appl. No. 09/819,462, filed Mar. 28, 2001, First Named Inventor Carl Steven Baumann.
Office Action (Mail Date Jun. 8, 2010) for U.S. Appl. No. 11/643,193, filed Dec. 21, 2006, First Named Inventor Susan Bumgardner Cirulli.
Office Action (Mail Date Mar. 18, 2010) for U.S. Appl. No. 11/643,193, filed Dec. 21, 2006, First Named Inventor Susan Bumgardner Cirulli.
Office Action (Mail Date Mar. 2, 2010) for U.S. Appl. No. 11/643,193, filed Dec. 21, 2006, First Named Inventor Susan Bumgardner Cirulli.
Office Action (Mail Date Jan. 20, 2011) for U.S. Appl. No. 11/983,111, filed Nov. 6, 2007, First Named Inventor Susan Bumgardner Cirulli.
Office Action (Mail Date Oct. 27, 2010) for U.S. Appl. No. 11/983,111, filed Nov. 6, 2007, First Named Inventor Susan Bumgardner Cirulli.
"IBM and MarketMile Forge e-business On Demand Alliance". Business Editors/High-Tech Writers. Business Wire. Feb. 19, 2002.
"Supply Side e-conomics". Duey, Rhonda. Oil and Gas Investor. May 2000.
Notice of Allowance (Mail Date Mar. 9, 2012) for U.S. Appl. No. 13/198,755, filed Aug. 5, 2011.
U.S. Appl. No. 13/198,755, filed Aug. 5, 2011.
Office Action (Mail Date Sep. 21, 2012) for U.S. Appl. No. 11/643,193, filed Dec. 21, 2006.

* cited by examiner

SYSTEM FOR MANAGING A SUPPLIER FOR PARTICIPATION IN A PLURALITY OF TRADING NETWORKS

This application is a divisional application claiming priority of Ser. No. 11/807,324, filed May 25, 2007, now U.S. Pat. No. 7,983,958, issued Jul. 19, 2011, which is a divisional of Ser. No. 09/798,598, filed Mar. 2, 2001, U.S. Pat. No. 7,243,077, issued Jul. 10, 2007.

BACKGROUND OF THE INVENTION

1. Technical Field of the Invention

This invention pertains to Internet services. More particularly, it relates to a system and method for managing relationships between trading network managers, suppliers and customers.

2. Background Art

The Internet provides exchange mechanisms where suppliers bring goods and services to be offered and malls for shoppers to obtain them. These exchange mechanisms are largely independent with a single company selling and an individual from another company shopping. Generally, if companies wish to partner to gain advantage either from consolidating purchase volumes to obtain better prices or from creating a complete palette of business goods and services to establish a 'one stop shop', many individual relations are established and managed independently. Manual integration of systems to ensure members rights and responsibilities are met increase the bureaucracy and paperwork. Should a company endeavor to participate or host multiple trading networks, the membership management becomes very difficult.

There is, therefore, a need in the art for a system establishing a base for varied relationships and a set of processes for managing them. Comprehensive support is needed for a single trading network and to facilitate business exchange for multiple trading networks. Such a system needs to combine a sales perspective with a buying perspective to support the entire business exchange, allowing for purchase of goods from a catalog, a contract, based on supplier preference for a commodity, or by way of a request for quote; it needs to support a membership fee based on straight subscription, per transaction or including agent fees, provide for automated membership term management (dropping sub-packages which expire), ensuring coverage of other sub-packages whose initial supplier has terminated its participation, and support many combinations of services, including information technology (IT) hosting alone, or combined with application management and sourcing and procurement business process management.

It is an object of the invention to provide an improved system and method for managing relationships between suppliers and customers within a trading network.

It is a further object of the invention to provide a single trading network method and system facilitating business exchanges for multiple trading networks.

It is a further object of the invention to provide a system and method for managing a trading network so as to combine sales and buying perspectives.

It is a further object of the invention to provide a system and method for managing a trading network so as to allow purchase of goods from a catalog, contract, supplier preference or request for quote.

It is a further object of the invention to provide a system and method for managing a trading network having a membership fee based on straight subscription, per transaction or including agent fees.

It is a further object of the invention to provide a system and method for managing a trading network which provides for automated membership term management (dropping sub-packages which expire), ensuring coverage of other sub-packages whose initial supplier has terminated its participation It is a further object of the invention to provide a system and method for managing a trading network which supports many combinations of services, including information technology (IT) hosting alone, or combined with application management and sourcing and procurement business process management.

SUMMARY OF THE INVENTION

In accordance with the preferred embodiment of the method of the invention a trading network is operated by establishing supplier memberships of suppliers providing offerings to said trading network; establishing customer memberships of customers providing volume commitments; and consolidating all volume commitments for a particular commodity or service when negotiating an offering with the supplier.

In accordance with an aspect of the invention, there is provided a computer program product configured to be operable to establish supplier memberships of suppliers providing offerings to said trading network; establish customer memberships of customers providing volume commitments; and consolidate all volume commitments for a particular commodity or service when negotiating an offering with the supplier.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiments of the invention, a data model with relationship details and entity attributes establish a base for defining and managing a variety of relationships. It provides integration alternatives for a trading network corporation and for its members.

From a buy side perspective, a company becomes a member of a trading network, making commitments and obtaining advantages. Actual transactions map back to initial commitments and result in accurate member billing. Memberships can include access to publicly traded items, to general member-traded items, or to custom packaged items for this member alone.

From a sell side perspective, a supplier makes commitments and obtains advantages. Again, actual transactions map back to initial commitments to ensure equitable payment or redress for supplier commitments. Suppliers may participate with general overall discounts, volume purchase agreements or with custom catalogs or contracts either for the entire network or for a set or given member to purchase from.

Figure 1:
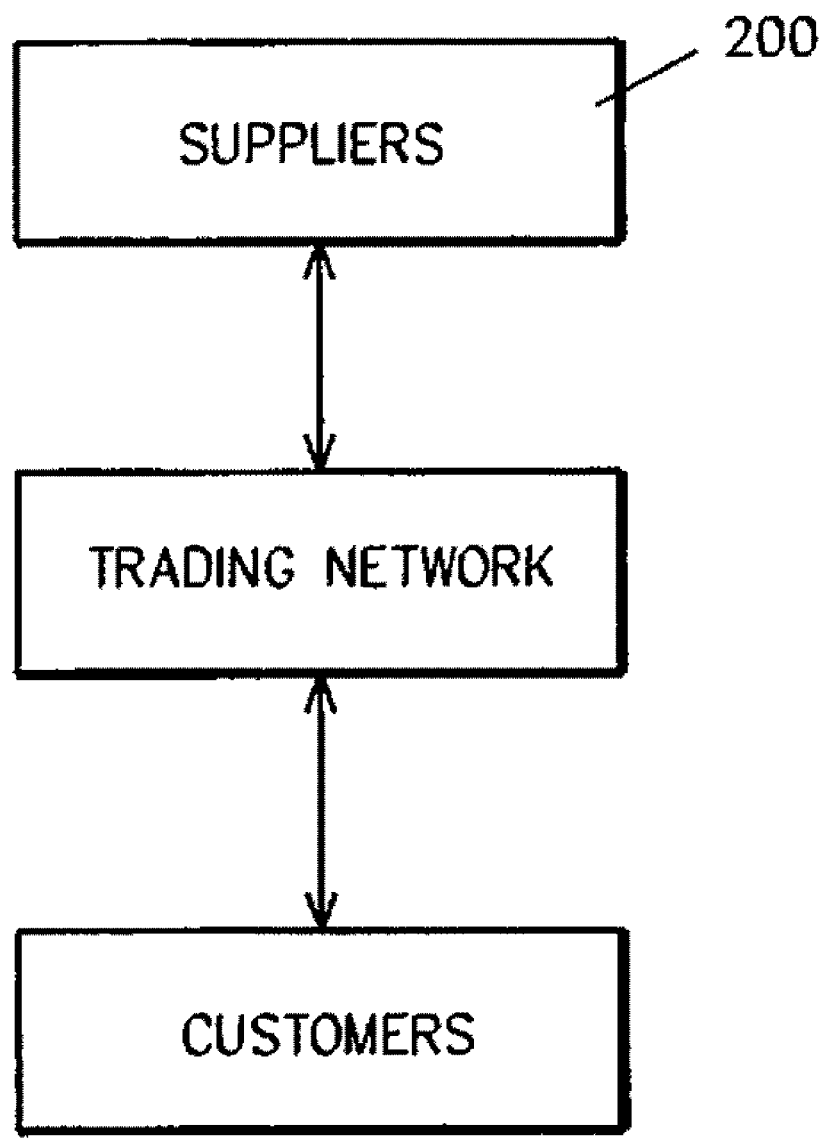
FIG. 1 illustrates the primary types of business parties and entities involved in a leveraged procurement network (LPN) in accordance with the preferred embodiment of the system of the invention.

Referring to FIG. 1, the three primary types of business parties involved in the leveraged procurement network of the preferred embodiments of the invention include suppliers 200, customers 204 and a trading network 202.

Figure 2:
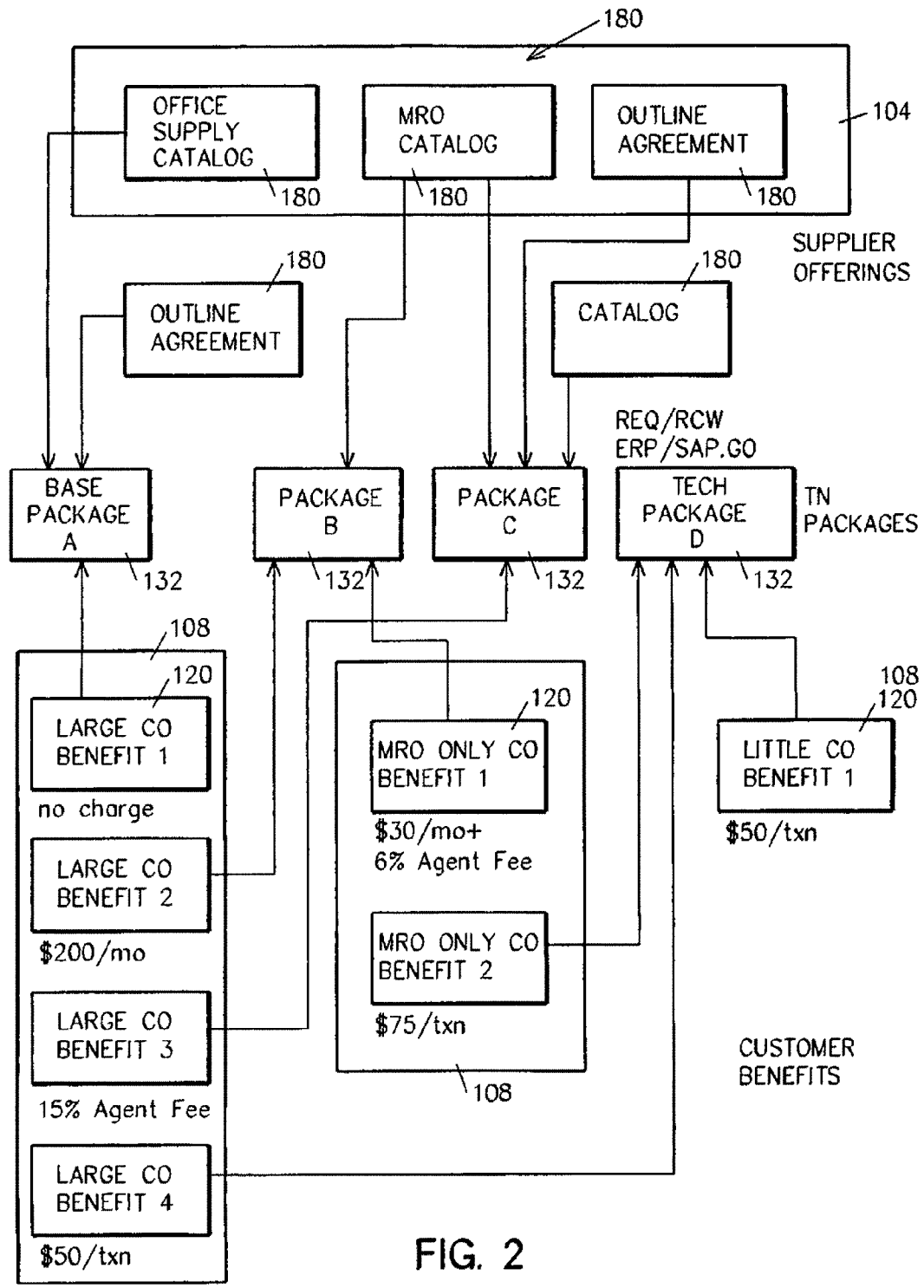
FIG. 2 illustrates an example of supplier and trading network offerings, customer benefits and trading network packages in further explanation of FIG. 1.

Referring to FIG. 2, an example of a leveraged trading network is illustrated, with reference numbers showing correspondence with the entities and relationships described hereafter with respect to FIG. 4. Thus, supplier offerings 180, or a collection 104 of supplier offerings 104, feed trading network packages 132. These trading network packages 132 are accessed by trading network customer benefit, or collections 108 of customer benefits.

Figure 3:
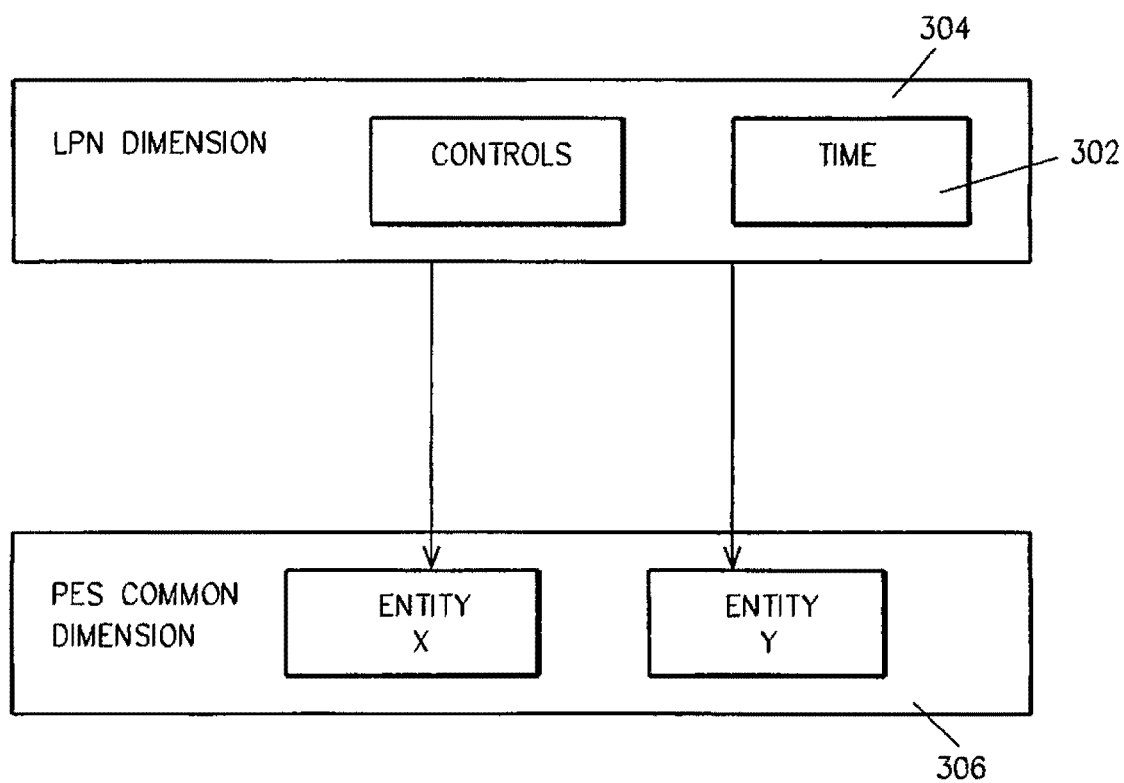
FIG. 3 illustrates that the leveraged procurement network of FIGS. 1 and 2 includes added dimensions on legacy procurement systems of controls and time.
Figure 4A:
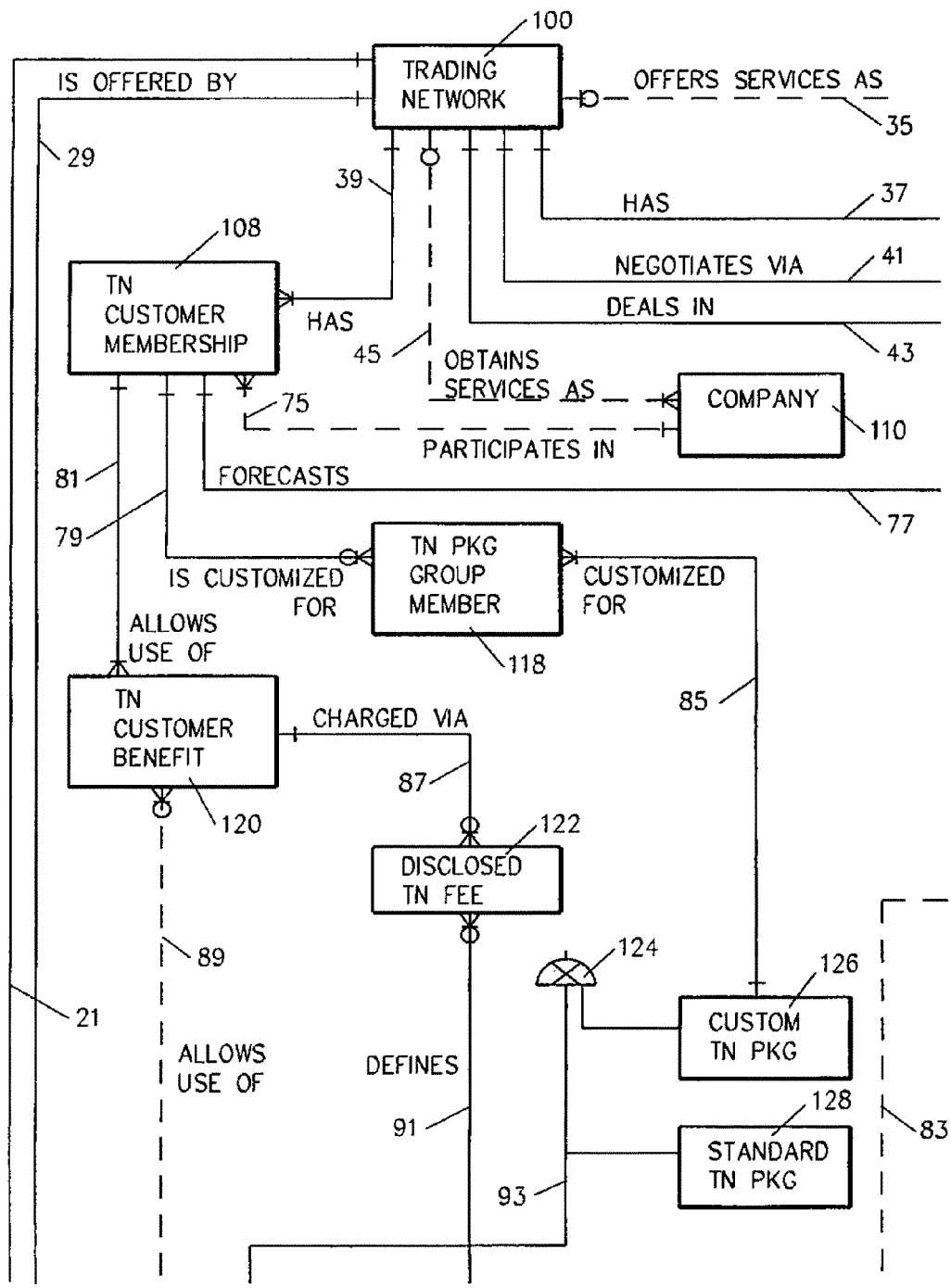
FIGS. 4A-4D are an entity relationship diagram illustrating business rules and entities comprising the leveraged procurement network of a preferred embodiment of the invention.
Figure 4B:
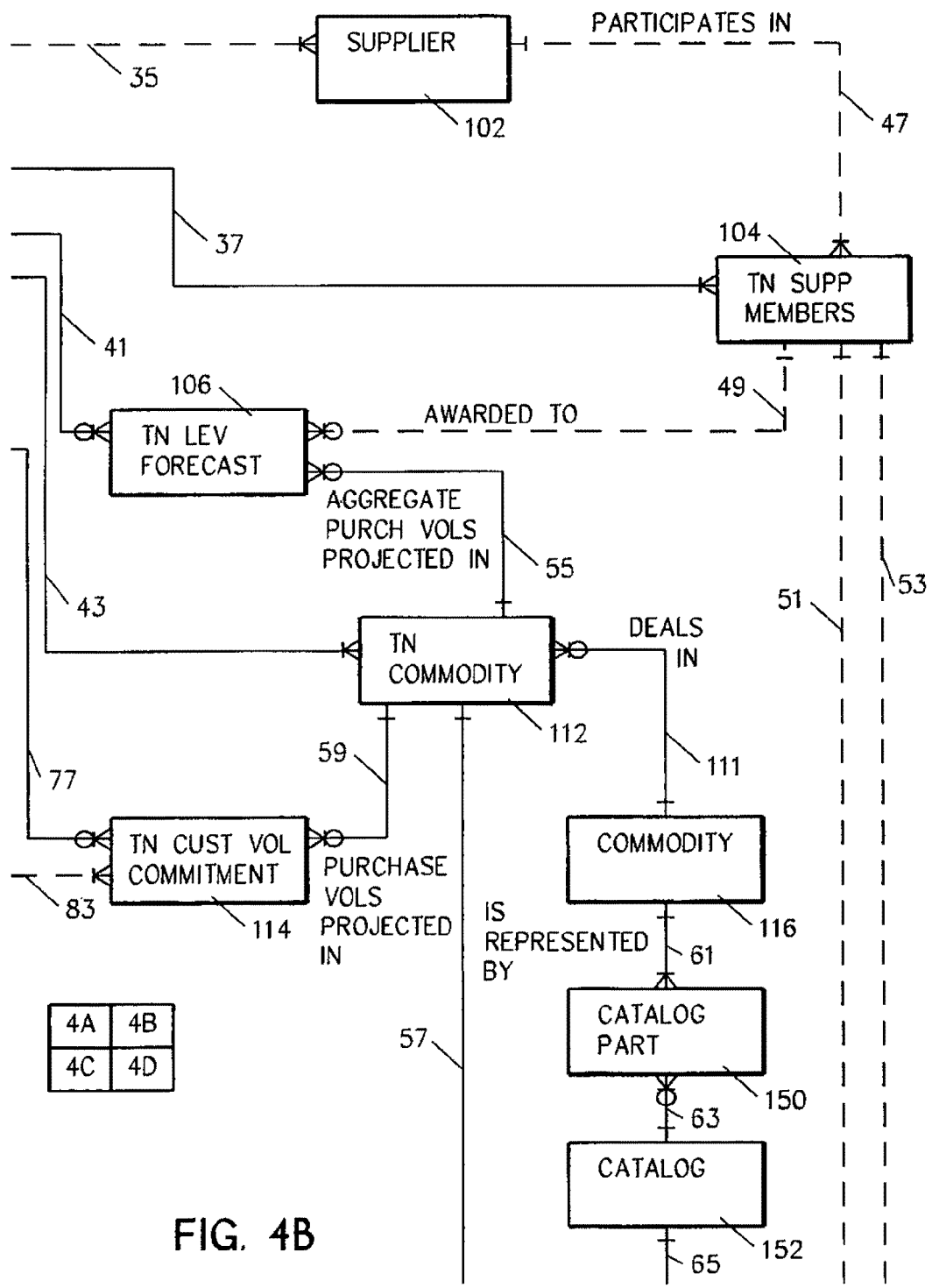
Figure 4C:
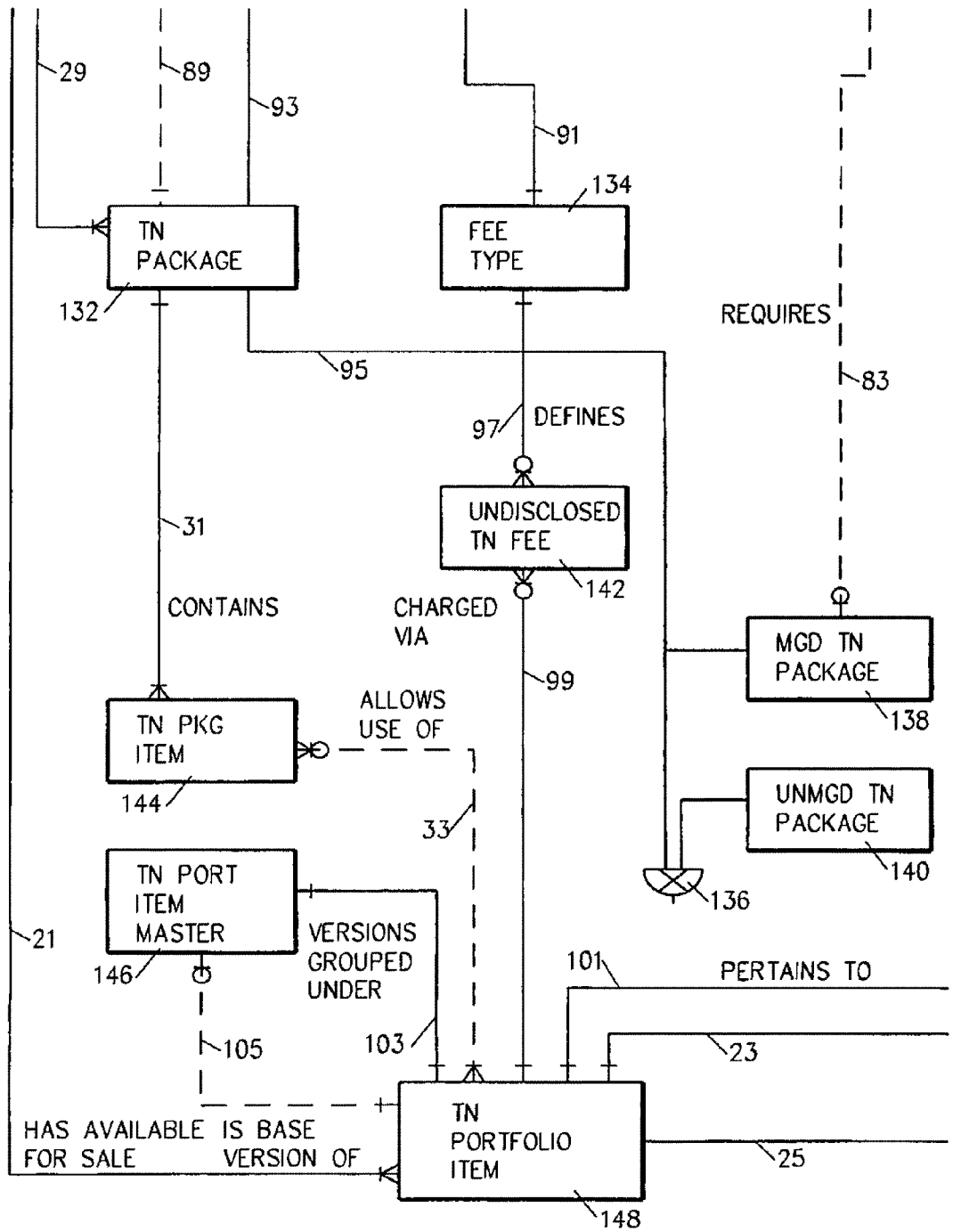
Figure 4D:
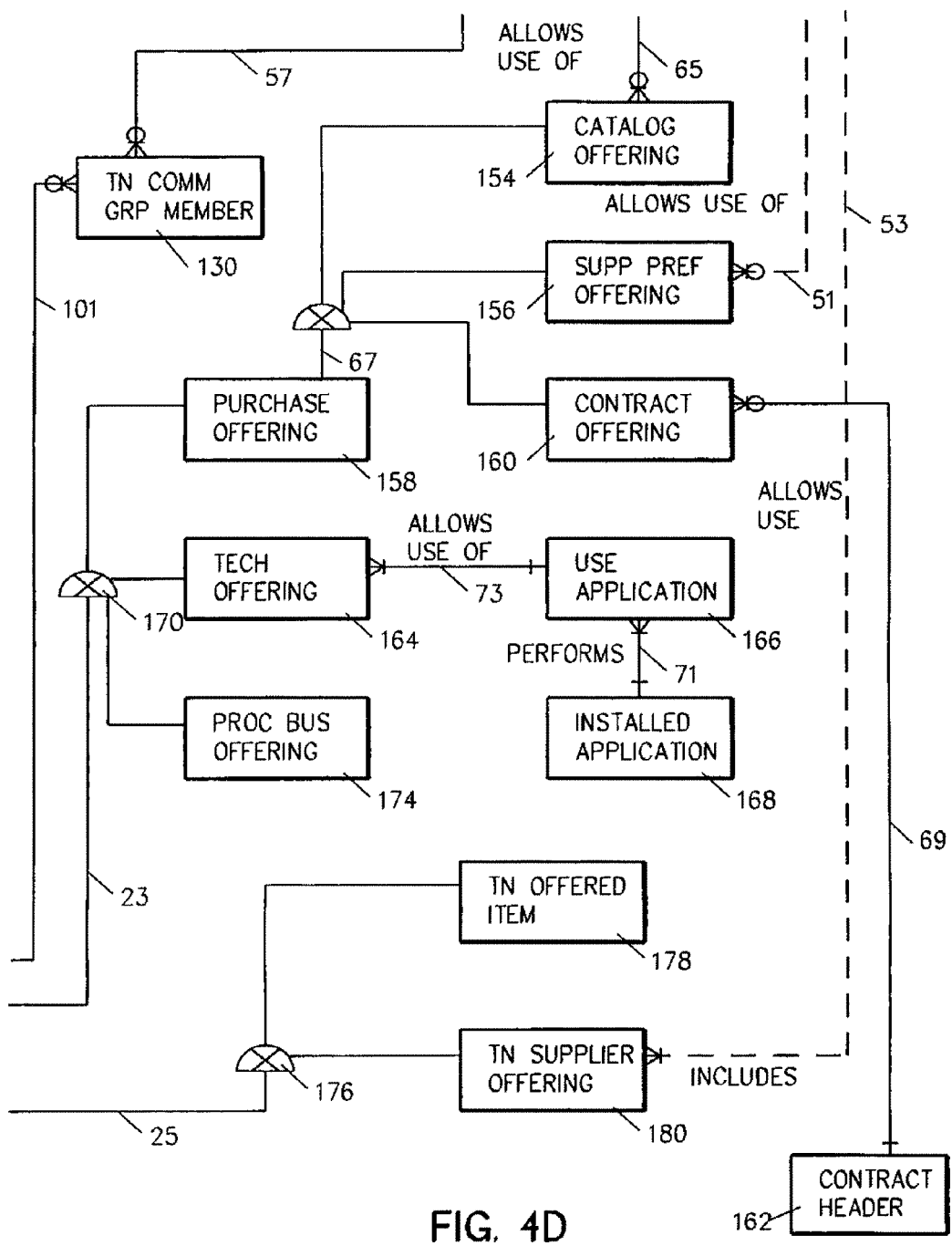

Referring to FIG. 3, the trading network model 304 of the preferred embodiment of the system and method of the invention sits on top of existing applications (e.g. Procurement e-Services) 306, with clock 302 representing the element of time. That is, in many cases, the time or duration of a package, benefit or offering will not be the same. For example, customer volume commitments and trading network (TN) leveraged forecast might span different periods or even different units of time. Also, all TN packages will most likely not have any fixed durations, such as: all good for one calendar year—they may span several years. However, it is contemplated that a customer membership benefit will not expire later than the trading network package nor later than the trading network membership, nor can it start earlier that the availability of the package or membership.

Referring to FIG. 4, an entity relationship diagram presents many of the entities and relationships implementing the preferred embodiment of the method and system of the invention. The system includes trading network (TN) 100, supplier 102, TN supplier membership 104, TN leveraged forecast 106, TN customer membership 108, company 110, TN commodity 112, TN customer volume commitment 114, commodity 116, TN package group member 118, TN customer benefit 120, disclosed TN fee 122, subtypes exclusive OR 124, custom TN package 126, standard TN package 128, TN commodity group member 130, TN package 132, fee type 134, subtypes exclusive OR 136, managed TN package 138, unmanaged TN package 140, undisclosed TN fee 142, TN package item 144, TN port item master 146, TN portfolio item 148, catalog part 150, catalog 152, catalog offering 154, supplier preference offering 156, purchase offering 158, contract offering 160, contract header 162, technical offering 164, BF_Uses_App 166, installed application 168, subtype exclusive ORs 170 and 172, process business offering 174, subtype exclusive OR 176, TN offered item 178, and TN supplier offering 180.

In the syntax of FIG. 4, solid lines refer to parent/child identifying relationships, and dotted lines to non-identifying relationships. That is, for doted lines, an entity may refer to another, but does not assume it—the entity does not get its identify from the other. All relationships illustrated in FIG. 4 are one to many, with the crows feet or tail representing many, and a one or zero at the head, where zero represents an optional relationship. A head can be a one or a one and a zero. A tail can be a zero and crows feet, or one, zero and crows feet (many).

As illustrated in the entity relationship diagram of FIG. 4, generally relationships are read in a clockwise direction. Thus, on horizontal lines, annotations on the top are read left to right and on the bottom right to left, and on vertical lines annotations on the left are read bottom up and those on the right are read top down.

While each entity is described more fully hereafter, the following examples are provided to illustrate the entity relationship diagram.

As is represented by relationship 21, a trading network 100 has available for sale at least one but possibly many TN portfolio items 148. One TN portfolio item 148 is available for sale from one trading network (TN) 100 only.

As is represented by relationship 23 to exclusive OR 170, one TN portfolio item 148 may be a purchase offering 158, or a technical offering 164, or a process business offering 174. As is represented by relationship 101, a TN portfolio item 148 pertains to zero, one or many TN commodity group members 130. As is represented by relationship 103, versions of TN portfolio item 148 are grouped under one and only one TN portfolio item master, each of which may pertain to many portfolio items 148. As is represented by line 105, a TN portfolio item 148 is a base version of zero or one TN port item master entities 146, which in turn pertain to one and only one TN portfolio item 148.

As is represented by relationship 23 and relationships 25 and 27, TN portfolio item 148 may be a purchase offering 158 and a trading network offered item 178. That is, as is represented by relationships 23 and 25, subtype XORs 170 and 176 are ANDed and one and only one of entities 158, 164 or 174 and one and only one of entities 178 and 180 must define a TN portfolio item 148. As is represented by relationship 67 in connection with XOR 172, purchase offering 158 may be a catalog offering 154, a supplier preference offering 156 or a contract offering 160.

A TN offered item 178 is a TN portfolio item 148 that is offered directly from the trading network itself, not from any of the suppliers in the network.

A TN supplier offering 180 is a trading network portfolio item 148 that is offered from one of the suppliers 102 in the network. This offering can be considered a line item within the supplier's membership agreement 104, and is defined by the following fields.

| | |
|---|---|
| SUPPMEM_KEY | Primary key of the supplier member 102 which is offering this item. |
| SUPPOFF_PAYFLOW_CD | A code defining the way in which payments for supplier and TN services flow (as described hereafter). |
| SUPPOFF_START_DT | The date on which this offering 180 is made available from the supplier 102. |
| SUPPOFF_END_DT | The date on which this offering 180 is made no longer available from the supplier 102. |

As is represented by relationship 29, identity is inherited by traversing down a solid line relationship path. For example, starting at TN 100 and going to TN package 132, a trading network 100 offers at least one and maybe many packages 132. It is also true that package 132 is offered by one and only one network 100. A plurality of trading networks 100 exists within a system, each identified by an ID number. Inheritance of identity means, for example, that TN package 132 is identified by an ID associated with a trading network and its own ID. As is represented by relationship 31, a trading network package 132 contains at least one but maybe many TN package items 144. Similarly, as is represented by relationship 33, TN package item 144 allows use of one TN portfolio item; and in the reverse sense, TN portfolio item 148 is used in maybe none but maybe many TN package items 144.

As is represented by relationship 37, trading network 100 has one or many TN supplier membership agreements 104, and a membership agreement 104 relates to one and only one trading network 100. As is represented by relationship 39, a trading network 100 has one or many TN customer membership agreements 108, and each customer membership agreement 108 pertains to one and only one trading network 100.

Entities relating primarily to customers 204 include entities 108, 110, 120, 122, 134 and 114. Entities relating primarily to suppliers include entities 102, 104, 150, 152, 154, 156, 160, 162 and 180. Entities relating primarily to the trading network (TN) include entities 106, 112, 118, 126, 128, 130, 132, 138, 140, 158, 164, 174, 142, 144, 146, and 148.

The Trading Network 100

Referring to FIG. 4, in accordance with the preferred embodiment of the invention, Trading network (TN) entity 100 provides services to a defined set of customer members (i.e., company) from a defined set of supplier members. Entity 100 includes, for each trading network, an entry including the following fields:

| | |
|---|---|
| TN_ID | Unique identifier of this trading network. |
| TN_NAME | Name of the trading network business entity. |

Trading network (TN) 100 is a legal entity including supplier members and customer members. It is not just a transient grouping of member companies, and it need not be specific to any one country. TN 100 aggregates forecasts from multiple customers for leveraging negotiations with a supplier and, conversely, can combine offerings from multiple suppliers into packages for assignment to a customer. TN 100 may offer services of its own, including hosted systems integration (allowing use of its applications and information technology infrastructure) and resale (taking title of some goods and reselling them directly to a customer). TN 100 may also do some procurement of its own, such as buy goods or services to be sold in the resale model.

The Trading Network Portfolio 148

Each trading network 100 has one portfolio of offerings 148 that it can sell to customer members 110. A TN portfolio item 148 is a single line item within a trading network's portfolio of services, including the following fields:

| | |
|---|---|
| TN_KEY | Primary key of trading network who holds this portfolio item 148. |
| TNMAST_KEY | Primary key of the TN portfolio item master, of which this entry is a version. |
| TNPORT_ID | The portion of the TN portfolio item's unique identifier that identifies which version of the master item that this instance happens to be. |
| TNPORT_OFFERBY_CD | A code identifying the general source of this portfolio item. That is, is it being offered by a supplier within the network, is it offered directly from the trading network itself, or is it a special version of a supplier offering with some TN spin on it. |
| TNPORT_CAT_CD | A code identifying the basic category of this portfolio item. That is, is it a purchase offering, a procurement business process offering, or a technical/application support offering. |
| TNPORT_TYPE_CD | A code which more uniquely defines the type of TN portfolio item with a category. |
| TNPORT_EXT_DESC | A description of this portfolio item. |
| TNPORT_INT_DESC | A description of this portfolio item for internal use only. |
| TNPORT_START_DT | The date on which this trading network portfolio item becomes available for sale to a customer in the network. |
| TNPORT_END_DT | The date on which this trading network portfolio item is no longer available. |

TN portfolio item master 146 is a common master from which several TN portfolio items 148 derive. The portfolio items 148 are different versions of the same master 146. This does not refer to different point-in-time snapshots of the same thing, but versions with some content difference, such as different prices, contains only a subset of the parts, different payment flow, and so forth. TN portfolio item master entity 146 is defined with reference to the following fields.

| | |
|---|---|
| TN_KEY | Primary key of the trading network 100 who owns the portfolio of which this is an item. |
| TNMAST_ID | Unique identifier of a given trading network portfolio item master. |
| BASE_TNPORT_KEY | Primary key of the TN portfolio item 148 that contains the base version of this master. |

Each trading network 100 has one portfolio of offerings 148 that it can sell to customer members 110. Each portfolio item can be sourced from one supplier member, who provides the offering as a line item in its membership contract (a TN supplier offering) or directly from the TN itself (a TN offered item.) Each portfolio item 148 can be of one basic type: purchasing offering, procurement business offering, or technical offering. For a single supplier offering a Trading Network may establish a master TN portfolio item with different versions (by price, by catalog content, etc) to facilitate correlation to different TN packages (high vol committed with max discounts vs standard or minimized liability).

A purchasing offering provides access to a purchasing catalog or contracts. A single purchasing offering is specific to a defined set of commodities. One given purchasing offering might enable the use of one given catalog, but not more than one. A given catalog purchasing offering may be valid for a longer period of time than a given time version of a catalog, for example, to which it points. Thus, there is no need for a timeless catalog master to be used as the offering pointer, nor is it necessary to update the purchase offering to point to a different catalog every time an updated version is released. One given purchase offering might enable the use of one given outline agreement contract, but not more than one. A given purchase offering may allow use of a given supplier as a preferred supplier. However, all customers of the trading network do not have to have the same preferred supplier.

A procurement business offering is any value-add service that the trading network can offer for a fee.

A technical offering allows use of specific applications for a given business function and the IT infrastructure.

A TN commodity group member 130 is one of the TN commodities that is referenced by a given TN portfolio item 148. This entity 130 is defined with reference to the following fields or parameters.

| | |
|---|---|
| TNPORT_KEY | Primary key of the TN portfolio item 148 to which this commodity 112 applies. |
| COMMTN_KEY | Primary key of the commodity 112 included in this group 130. |

The Packages 132, 144

A TN package 132 is a collection of TN supplier offerings that can be assigned as a benefit to a customer member(s). It may be managed or unmanaged and it may be standard or customized for one set of customers. A TN package entity 132 includes the following fields:

| | |
|---|---|
| TN_KEY | Primary key of the trading network 100. |
| TNPKG_ID | Unique identifier for this package. |
| TNPKG_NAME | Name of this TN package. |
| TNPKG_START_DT | The date on which this TN package becomes available. |
| TNPKG_END_DT | The date on which this TN package is no longer available. |
| TNPKG_EXT_DESC | Description of this TN package intended for the eyes of prospective customers. |
| TNPKG_INT_DESC | An internal-use-only description of this TN package. |
| TNPKG_RATE_AMT | The standard, suggested monthly price charged for this package. It can be replaced with a different fee or fee structure. |
| TNPKG_CUSTZN_CD | A code indicating whether this TN package is customized, standard, etc. |
| TNPKG_MNGD, CD | A code indicating the level of customer commitment needed to qualify for use of this package. This identifies whether the package will be managed or not. |

As is represented by relationship 93 and XOR 124, TN package 132 may be a custom TN package 126 or a standard TN package 128. As is represented by relationship 95 and XOR 136, TN package 132 may be a managed TN package 138 or an unmanaged TN package 140.

A TN package item 144 is one specific line item within a TN package. It includes the following fields:

| | |
|---|---|
| TNPKG_KEY | Primary key of TN package parent. |
| TNPKGITM_ID | Unique identifier for this item within the package. |
| TNPORT_KEY | Primary key of the TN portfolio item 148 that is being included in this package. |

A trading network 100 offers packages 132 made up of collections of their portfolio items 148 to its customer members. Each TN package item 144 is tied to one portfolio item 148, and the same portfolio item can be included in a plurality of packages. A TN package 132 can include TN package items 144 that come from different TN supplier members 104 or from the TN 100 directly. A TN package 132 can be assigned as a benefit 120 to a TN customer member entity 108. Customer paid fees 122 are based at the package 132 header level. TN package items 144 can be changed directly (addition or removal of TN supplier offering 180) as time goes on and offerings change, instead of continually modifying a collection of TN customer benefits 120.

A TN package 132 may be either a managed 138 or not managed 140 package. If it is a managed package 138, a purchase volume commitment is required from the customer and the TN BPM will track progress against the commitment. If a package 132 is an unmanaged package 140, there is no commitment requirement and no tracking of actual purchases (other than for fee calculation purposes).

A managed TN package 138 is managed by trading network 100 and is a subtype of the TN package entity 132 which is defined with reference to the following parameter.

| | |
|---|---|
| TNPKG_MNGD_AMT | The total monetary amount expected to be purchased through this package, from all applicable customers. |

An unmanaged TN package 140 is a trading network package 132 that can be used without any corresponding customer commitment. It is a subtype of the TN package entity 132. As is represented by relationship 83, managed TN package 138 requires one or many TN customer volume commitments 114, each of which pertains to zero or one package entities 138.

A TN package 132 will be either a standard package 128 or a customized package 126. If it is customized, it is set up just for a particular customer and can only be assigned as a benefit to predefined set of companies. If it is standard, then it can be assigned to any TN customer member entity 108. The TN packages 132 assigned to each customer 110 are determined by trading network 100 (not the customer).

A custom TN package 126 is a trading network package that has been customized for one given set of customer members 108. This is a subtype entity of the TN package entity 144. A standard TN package 128 is a standard or general trading network package 132 that can be assigned as a benefit 120 to any valid customer 110. This is a subtype of the TN package entity 132. As is represented by line 85, a custom TN package 126 is customized for one or many TN package group members 118, each of which pertains to one and only one custom TN package 126.

A TN package group member 118 is one of the set of customer members 108 for whom a given TN package 132 has been customized. It is defined with reference to the following parameters.

| | |
|---|---|
| TNPKG_KEY | Primary key of the customized TN package 126. |
| CUSTMEM_KEY | Primary key of the customer member 108 for whom the TN package 132 has been customized. |

As is represented by relationship 79, a TN package group member is customized for one and only one TN customer membership entity 108, which in turn includes zero, one or more TN package group members 118.

The Customers 110

A given company 110 can become a customer member 108 of multiple trading networks 100 by entering into a contract including such provisions as duration of membership and planned billing frequency. As is represented by relationship 45, trading network 100 obtains services as one or many companies 110, and each company 110 pertains to zero or one trading networks 100. As is represented by relationship 75, company 110 participates in one or many TN customer membership contract line item entities 108, each of which pertains in turn to one and only one company 110.

The TN customer membership entity 108 is a legal agreement or contract between a trading network 100 and a participating customer company 110. Entity 108 is defined with reference to the following parameters.

| | |
|---|---|
| TN_KY | Primary key of the trading network 100. |
| CUSTMEM_ID | Unique identifier of this TN customer membership 108. |
| CO_KEY | Primary key of company 110. |
| CUSTMEM_START_DT | The date on which this custom membership 108 begins. |
| CUSTMEM_END_DT | The date on which this customer membership 108 expires. |
| CUSTMEM_BILFREQ_CD | A code defining the frequency with which this customer member 110 will be billed from the trading network 100. |

As is represented by relationship 81, TN customer membership entity 108 allows use of one or many TN customer benefits 120, each of which pertains to one and only one membership entity 108.

The benefit provided to customer members by the trading network is the ability to use selected packages 132 of the trading network portfolio items 148. Each defined benefit has a validity date range. The essence of a given purchase offering 158, including prices, delivery specifics, quality, etc., are the same for all TN customer members 108 who have the right to use that offering 158 since the terms negotiated use an aggregation of multiple customer forecasts 106, assuming there is no per-order tiered pricing. As is represented by relationship 41, trading network 100 negotiates by way of zero or many TN level forecasts 106, and each forecast 106 pertains to one and only one trading network 100.

A TN customer benefit 120 is a single line item of the customer agreement 108 with the trading network 100. It identifies a TN package 132 that the customer may enjoy as part of its membership. The benefit 120 is specific to a given validity time period, and is defined with respect to the following parameters.

| | |
|---|---|
| CUSTMEM_KEY | Primary key of the TN customer membership parent 108. |
| CUSTBEN_ID | Unique identifier of this customer benefit 120. |
| CUSTBEN_START_DT | The date on which this customer benefit 120 takes effect. This cannot be earlier than the start of the customer's 110 membership in the network 100, nor can it be earlier than the availability date of the assigned package 132. It can be later than either of those dates. |
| CUSTBEN_END_DT | The date on which this customer benefit 120 expires. This cannot be later than the expiration date of the customer's membership in the network, nor later than the expiration date of the relevant package. It can be earlier than either of those dates. |
| TNPKG_KEY | Primary key of the TN package 132 that this benefit 120 allows the customer to receive. |

As is represented by relationship 87, a TN customer benefit 120 may be charged by way of zero, one or many disclosed TN fee entities 122, each of which pertains to one and only one TN customer benefit 120. As is represented by relationship 89, TN customer benefit entity 120 allows use of one and only one TN package 132, each of which pertains to zero, one or many TN customer benefit entities 120.

A TN purchase offering 158 is a TN portfolio item 148 that allows use of a given purchasing resource, such as a catalog 152 or contract 160. This offering entity 158 is defined by the following field.

| | |
|---|---|
| PURCHOFF_TYPE_CD | A code identifying the type of this purchasing resource offering 160, such use of a catalog 152, use of an outline agreement or contract 160, or use 156 of a designated supplier 102 as the preferred supplier. |

A catalog offering 154 is a TN portfolio item 148 that allows use of a specific catalog 152. This entity is defined by the following field.

| | |
|---|---|
| CATLG_KEY | Primary key of the catalog to which this offering directly applies. |

As is represented by relationship 65, a catalog offering 154 allows use of one and only one catalog 152, and as is represented by relationships 65 and 63, catalog 152 pertains to zero, one or many catalog offerings 154 and zero, one or many catalog parts 150. As is represented by relationship 61, catalog part 150 is represented by one and only one commodity 116, and commodity 116 pertains to one or many catalog parts 150. As is represented by relationship 111, TN commodity 112 deals in one and only one commodity 116, and commodity 116 pertains to zero, one or many TN commodities 112.

A contract offering 160 is a TN portfolio item 148 that allows use of a specific contract or outline agreement. This entity is defined by the following field.

| | |
|---|---|
| CNTR_KEY | Primary key of the contract/outline agreement 162 to which this offering 160 directly applies. |

As is represented by relationship 69, contract offering 160 allows use of one and only one contract header 162, which header 162 may pertain to zero, one or many contract offerings 160.

A supplier preference offering 156 is a TN portfolio item 148 that allows a specific TN supplier 102 to be used as the preferred supplier for a given set of commodities 112. This entity 156 is defined with reference to the following field.

| | |
|---|---|
| SUPPMEM_KEY | Primary key of the TN supplier member 102 to whom this offering directly applies. |

As is represented by relationship 51, supplier preference offering 156 allows use of one and only one TN supplier membership contract 104, and contract entity 104 may include zero, one or many supplier preference offerings 156.

A technology offering 164 is a TN portfolio item 148 that allows use of a given technical resource, such as a procurement e-services application. This entity 164 is defined with reference to the following field.

| | |
|---|---|
| BFAPPUSE_KEY | Primary key of the PeS application to which this offering directly applies. |

As is represented by relationship 73, technology offering 164 allows use of one and only one application 166, which as is represented by relationship 71 refers to one and only one installed application 168. Installed application 168 pertains to one or many applications 166, each of which pertains to one or many technology offerings 164.

Procurement business offering 174 is a TN portfolio item 148 that provides access to a procurement business process service, such as a full-buyer purchasing.

TN member benefits 120 include the ability to create requisitions directly from specific TN contracts. A TN member benefit includes the ability to create requisitions directly from specific trading network contracts (outline agreements) 160 and from specific TN versions of supplier catalogs 154, including both internal external (punch-out) catalogs.

Conversely, a TN member may have to make commodity-specific volume commitments in turn for getting some of the benefits. However, a given customer need not commit all of its volumes to an one trading network, and can split purchase between several.

A trading network commodity 112 is one valid commodity with which this trading network 100 deals. Entity 112 is defined by the following fields.

| | |
|---|---|
| TN_KE | Primary key of the TN dealing with this commodity. |
| COMM_KEY | Primary key of the commodity with which this TN deals. |

As is represented by relationship 43, trading network 100 deals in one or many TN commodities 112, and each TN commodity pertains to one and only one trading network 100. As is represented by relationship 55, TN commodity 112 aggregates purchase volumes projected in zero, one or many TN level forecasts 106, and each forecast 106 pertains to one and only one TN commodity 112. As is represented by relationship 57, a TN commodity 112 belongs to zero, one or many TN commodity group member entities 130, and each member entity 130 pertains to one and only one TN commodity 112. As is represented by relationship 59, the purchase volumes of TN commodity entity 112 are projected in zero, one or many TN customer volume commitment entities 114, an each commitment entity 114 pertains to one and only one TN commodity.

A trading network level forecast 106 is determined when the TN 100 negotiates contracts with a supplier member 102. It is created by gathering together the individual customer member volume commitments 114, in conjunction with analysis of any applicable procurement history or knowledge. A given forecast 106 pertains to a specific period of time. Forecast entity 106 is defined by (that is, with reference) the following fields (or, parameters).

| | |
|---|---|
| TN_KEY | Primary key of trading network 100. |
| COMMTN_KEY | Primary key of the TN commodity 112 to which this Forecast 106 applies. |

-continued

| | |
|---|---|
| TNLEV_ID | Unique identifier of this specific TN leveraged forecast 106 for this commodity 112. |
| TNLEV_TIMEPER_ID | The period of time to which this forecast pertains. |
| TNLEV_TIMEUOM_CD | The unit of measure in which the period of time is expressed. |

As is represented by relationship 49, a TN level forecast 106 is awarded to one and only one TN supplier membership contract 104, and membership contract entity 104 may include zero or many TN level forecasts 106.

A TN customer volume commitment entity 114 is a forecast of the volumes for this commodity 112 that the customer 110 expects to purchase as part of its agreement 108 with the trading network 110. The estimation is specific to a given period of time, and is defined with reference to the following parameters.

| | |
|---|---|
| CUSTMEM_KEY | Primary key of the trading network 100 making this commitment. |
| COMMTN_KEY | Primary key of the TN commodity 112 to which this commitment 114 pertains. |
| CUSTCMT_TIMEPER_ID | The period of time to which this commitment 114 pertains. |
| CUSTCMT_TIMEUOM_CD | The unit of measure in which the period of time is expressed. |
| CUSTCMT_AMT | Monetary amount that this customer 110 expects to spend as part of this commitment 114. |
| CUSTCMT_START_DT | The date on which the commitment begins. |
| CUSTCMT_END_DT | The date on which the commitment ends, by which the committed amount is to have been spent. |
| TNPKG_KEY | Primary key of the managed TN package 138 whose assignment as a TN customer benefit 120 this commitment 114 will earn. |

As is represented by relationship 77, TN customer membership entity forecasts zero, one or many TN customer volume commitments 114, each of which pertains to one and only one TN customer membership entity 108.

The Suppliers 102, 104, 180

By entering into a white paper contract 104, a supplier 102 can become a supplier member of one or more trading networks 100. As is represented by relationship 47, a supplier 102 participates in one or many supplier membership contracts 104, and each membership contract 104 pertains to one and only one supplier 102. As is represented by relationship 35, TN 100 offers service as one or more suppliers 102, and a supplier 102 may be part of zero or one trading networks 100. As is represented by relationship 53, a given TN supplier offering 180 represents a single line item under a TN supplier membership contract 104. As is further represented by relationship 53, a given TN supplier offering 180 is owned by only one trading network 100, and it is an item 148 in its portfolio. A given TN supplier offering 180 is committed from only one supplier 102. Undisclosed TN agent fees 142 allow any given TN supplier offering 180 to be modified to include TN fees on top of supplier prices. As there may be different levels of the same base offering, then each different level is a different offering and it is important to ensure that a given customer member does not get assigned to different versions of the same base offering.

A TN supplier membership 104 is an agreement, contract or understanding between a trading network 100 and a participating supplier 102. It is defined with reference to the following parameters.

| | |
|---|---|
| TN_KEY | Primary key of the trading network 100. |
| SUPPMEM_ID | Unique identifier of this TN supplier membership or contract 104. |
| SUPP_KEY | Primary key of the supplier 102. |
| SUPPMEM_START_DT | The date on which this supplier membership or contract begins. |

Paying for Trading Network Value Add 134, 142, 122

The fee 134 for TN services may be disclosed to the customer or they may be undisclosed. Disclosed TN fees 122 are based at the customer benefit 120 level and are paid directly to the trading network 100 by the customer 110 on the assumption that it would be illogical to involve the supplier 102 in rebating fees that have been disclosed to the customer 110. Undisclosed fees 142 are based at the TN portfolio item 148 level. In some cases, the trading network's portion or value-add-fee will be included (hidden) in the purchase prices presented to customer 110 but fees for TN offered items 178 (those not from suppliers) are disclosed. Both disclosed and undisclosed fees may be combined on the same customer benefit 120.

A disclosed fee 122 is a trading network value-add fee that the customer will knowingly pay to the trading network 100 whenever this TN customer benefit 120 is used. It is defined with reference to the following parameters.

| | |
|---|---|
| CUSTBEN_KEY | Primary key of the TN customer benefit 120 to which this fee applies. |
| FEETYPE_KEY | Primary key of the fee type being used. |

An undisclosed fee 142 is a trading network value-add fee that the customer will unknowingly pay to the trading network 100 whenever this TN portfolio item 148 is used. In the case of purchase offering 158, for example, this fee 142 is added onto the product prices before they are seen by the customer. When this is an item 148 whose fee is to be rebated from supplier 102, this is what has been negotiated with the supplier. This entity 142 is defined with reference to the following fields.

| | |
|---|---|
| TNPORT_KEY | Primary key of the TN portfolio item 148 to which this fee applies. |
| FEETYPE_KEY | Primary key of the fee type being used. |
| UNDISFEE_VAL | Value of the fee. Depending on the fee type, this is represented as either a monetary amount or as a percentage. |

As is represented by relationship 99, an undisclosed TN fee is charged via one TN portfolio item 148.

There are different types of fees 134 that can be assessed. These different types of fees may be combined on the same benefit 120 or portfolio 148 item. Fee type entity 134 defines the various types of fees that can be levied by TN at the TN customer benefit 120 and TN portfolio item levels, and includes the following fields.

| | |
|---|---|
| FEETYPE_CAT_CD | A code identifying the basic, defining category of a given type of trading network value-add fee. These are described hereafter. |
| FEETYPE_CD | A code which uniquely identifies a very specific type of TN fee within its defined category, such as unit of measure, or the unit upon which an agent fee is based. |
| FEETYPE_DISCL_FG | A flag indicating whether or not this type of fee is valid for use as a disclosed (TN customer benefit 120 based) fee. |
| FEETYPE_UNDISCL_FG | A flag indicating whether or not this type of fee is valid for use as an undisclosed (TN portfolio 148 based) fee. |
| FFTYPE_REBATE_FG | A flag indicating whether or not this type of fee is logical for use in conjunction with a payment flow where the customer pays all to the supplier and the supplier rebates the TN's fee back to the TN 100. |
| FEETYPE_DESC | Description of this type of trading network value-add feel. |

As is represented by relationships 91 and 95, fee type 134 defines zero or many disclosed TN fee entities 122 and zero one or many undisclosed TN fee entities 142, respectively.

A subscription fee is a flat periodic charge for a given customer benefit 120, one that is assessed whether or not the customer took advantage of the service. Such a fee involves no special calculations, would never be undisclosed, and would be based on the billing frequency defined in the customer membership agreement 108.

A TN agent fee represents a percentage of amount purchased that is paid to the trading network. This type of fee may be either disclosed or undisclosed, and must be tracked. That is, actual invoices are tracked back to their originating customer benefit 120 and/or TN supplier offering 180.

TN agent fee=invoice total*fee percentage.

A per-service unit fee is a flat amount charged for each procurement service performed, and would require the use of an accompanying service UOM definition. Such a fee type would normally not be undisclosed. It is necessary to track documents or other service instances back to their originating customer benefit 120 in order to calculate this fee.

Per-service fee=actual service count*per-service unit fee.

Similar to the per-service unit fee, a per-tech unit fee is a flat amount charged for each use of a tech offering 164. Whenever this is used, there would be an accompanying tech UOM definition specifying what is the tech unit—a web site hit, a txn, a mip; or so forth. This type of fee may be either disclosed or undisclosed. It is necessary to track actual IT usage and trace back to its corresponding customer benefit 120 and/or TN portfolio item 148 to calculate this fee.

Per-tech fee=actual tech unit count*per-tech unit fee.

Several different types of customer payment flows are based at the TN portfolio item 148 or supplier offering 180 level.

Payment for TN supplier offerings 180 can be made (1) from the customer directly to the supplier member 102, with any TN fee paid separately to the TN 100; (2) directly to the supplier member 102, with a TN 100 fee rebated from the supplier 102 to the TN 100; or (3) directly to the TN 100 with a corresponding TN 100 payment to the supplier member 102. The second payment type would be part of the TN agreement with the supplier 102, so it would not be able to vary among the TN customer members at the benefit 120 level to whom the offering 180 is assigned. Any variation in fee here would necessitate a separate TN supplier offering 180.

Payment for TN offered items 178 (those not coming from a supplier 102) are made directly to the trading network 100. Some TN services may be charged to the supplier 102, not the customer 110.

Other Features

A common data administration function assures that no TN violations exist in more detailed data. Thus, if a given company 110 does not have access to a given TN portfolio item 148, such as a supplier catalog 152, then a plant within that company is not to be assigned to that catalog. An employee of a non-benefited company 110 is not to have access to an outline agreement or be able to use a given application tech service or use any other procurement services from the TN 100.

The time limitations previously described are exploded down to the detail level, so batch programs are provided to clean up administration data when packages 132 or benefits 120 expire such that a company which is an active member of a trading network 100 uses only those suppliers 102 who are active members of the same trading network(s) 100, a plant may use a catalog only if that catalog is part of an active package 132 and the plant's company 110 has an active subscription to that package, and an employee or department or company may use a contract only if that contract is part of an active package 132 and the plant's company 110 has an active subscription to the package.

Advantages Over The Prior Art

It is an advantage of the invention that there is provided an improved system and method for managing relationships between suppliers and customers within a trading network.

It is a further advantage of the invention that there is provided a single trading network method and system facilitating business exchanges for multiple trading networks.

It is a further advantage of the invention that there is provided a system and method for managing a trading network so as to combine sales and buying perspectives.

It is a further advantage of the invention that there is provided a system and method for managing a trading network so as to allow purchase of goods from a catalog, contract, supplier preference or request for quote.

It is a further advantage of the invention that there is provided a system and method for managing a trading network having a membership fee based on straight subscription, per transaction or including agent fees.

It is a further advantage of the invention that there is provided a system and method for managing a trading network which provides for automated membership term management (dropping sub-packages which expire), ensuring coverage of other sub-packages whose initial supplier has terminated its participation.

It is a further advantage of the invention that there is provided a system and method for managing a trading network which supports many combinations of services, including information technology (IT) hosting alone, or combined with application management and sourcing and procurement business process management.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element comprising executable instructions recorded on a physical storage or memory device such as a magnetic or optical tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

The invention claimed is:

1. A system, comprising a computer that includes a physically tangible storage device readable by the computer, said storage device storing a program of instructions configured to be executed by the computer to perform a method for managing a supplier for participation in a plurality of trading networks, said method comprising:
    receiving from each said trading network a volume commitment consolidating a plurality of trading network customer volume commitments for offerings of commodities and services;
    negotiating an offering with each said trading network to supply to customer members of said trading network a commodity or service of said commodities and services;
    building, in an electronic storage device for each trading network of said plurality of trading networks, a trading network entity, said trading network entity including for said supplier a supplier entity with attributes including start date, end date, sets of services and products offered to said trading network, and payment flow for said commodities and services;
    offering at least one trading network package, said trading network package based on negotiations occurring prior to receiving purchase requests from said customer members;
    selectively defining each said trading network package as including: (i) a trading network value-add service offering offered by said trading network to said customer members for a fee, and (ii) a managed package for which a customer member of said customer members provides a volume commitment and for which actual purchases are tracked; and
    negotiating price discount levels for committed levels of demand from said trading networks.

2. The system of claim 1, said method further comprising:
    defining each said trading network package as a grouping of contracts and catalogs that have been negotiated with a trading network supplier prior to receiving purchase requests from said customer members by the trading network with said trading network supplier.

3. The system of claim 1, said method further comprising:

collecting into a benefit package of the at least one trading network package a plurality of supplier offerings assignable as a benefit to said customer members; and defining said benefit package as a custom package or a standard package, said custom package being a package which can only be assigned as a customer benefit to a predefined set of customers of said customer members and said standard package being a package which can be assigned to any customer member of said customer members.

4. The system of claim 1, said method further comprising:

defining a first trading network package of a first trading network of the at least one trading network package as a plurality of portfolio items.

5. The system of claim 4, said method further comprising:

defining each said portfolio item as a purchase offering providing access selectively to a purchasing catalog or contract.

6. The system of claim 4, said method further comprising:

defining each said portfolio item as a technology offering allowing use of specific applications for a given business function and an Information Technology (IT) infrastructure.

7. The system of claim 4, said method further comprising:

defining each said portfolio item as procurement business offering, said procurement business offering being a value-add service of said first trading network that said first trading network offers for a fee.

8. The system of claim 4, said method further comprising:

defining each portfolio item as a trading network offered item or a supplier offering, said trading network offered item being offered directly from the first trading network itself and not from suppliers in the first trading network; and said supplier offering being a trading network portfolio item that is offered from one supplier of said suppliers in the first trading network as a line item within a supplier's membership agreement.

\* \* \* \* \*